United States Patent Office

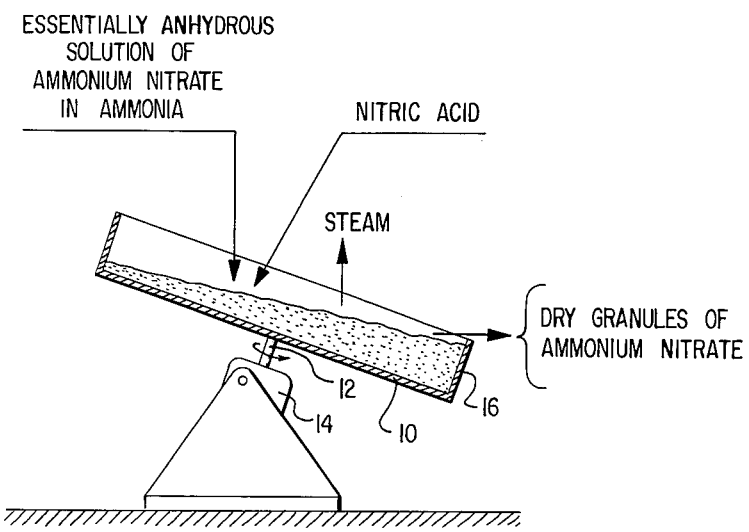

3,211,522
Patented Oct. 12, 1965

3,211,522
PRODUCTION OF AMMONIUM NITRATE GRANULES
Robert A. Shurter, Jr., and Archie P. Miller, Terre Haute, Ind., assignors to Commercial Solvents Corporation, New York, N.Y., a corporation of Maryland
Filed Aug. 31, 1960, Ser. No. 53,063
5 Claims. (Cl. 23—103)

Our invention relates to a process for the production of small particles of substantially dry, granular ammonium nitrate.

Ammonium nitrate is an important fertilizer material that supplies nitrogen to the soil. It is especially suited for use as a nitrogen supplying fertilizer because nitrogen is provided by both the ammonia and nitrate portions of the compound. Thus, not only is nitrogen made available to the soil in greater amounts per unit weight of fertilizer, but also another advantage is obtained by providing the soil with both quickly available nitrate nitrogen and more slowly available ammonia nitrogen at one spreading. There is thus a longer period of time in which nitrogen is available to the soil. The growing crop is provided with nitrogen at its important start of growth and also later on at its normal growing cycle.

The easiest and most preferred way of handling ammonium nitrate in field application is in the form of small, dry, granules. In the form of granules, ammonium nitrate can be easily mixed with other granular materials that ought to be added to the soil and the whole process of fertilizing can be accomplished in one spreading.

There have been numerous processes proposed for preparing small particles of solid ammonium nitrate. For example, it has been proposed to granulate ammonium nitrate by heating the moist crystals of ammonium nitrate. It has also been proposed to subject ammonium nitrate to high temperatures, thus melting it, and to disperse this fusion in the form of droplets into a cooling gas. Still another method, is to flow molten ammonium nitrate onto a cooling belt and then break up the solid ammonium nitrate thus formed into the desired particles.

All the present ways of making ammonium nitrate granules require great expenditures of capital to build the installations necessary to make ammonium nitrate particles. Because of the great investments necessary to build these plants not many of them are built, thus resulting in long lines of supply which in turn result in high freight charges in bringing the ammonium nitrate granules to the farmer.

It is an object of our invention to provide a process for producing small particles of dry, solid ammonium nitrate.

It is a further object of our invention to provide a process for producing small particles of dry, solid ammonium nitrate in a more convenient manner than previously employed.

It is a further object of our invention to provide a process for producing small particles of dry, solid ammonium nitrate which results in a more uniform product.

It is a further object of our invention to make ammonium nitrate from a commercially available ammoniating solution.

It is a further object of our invention to reduce the amount of nitric acid, that must be used as such, in the production of ammonium nitrate.

These objects and others will be more readily understood from the following detailed description and accompanying drawing which illustrates schematically a device which can be used to carry out the process of this invention.

In our process we prefer to use an essentially anhydrous solution of ammonium nitrate in ammonia although any commercially available ammoniating solution containing up to 6 percent water can be used. We add this anhydrous solution onto a granulating pan together with nitric acid. The solutions of ammonium nitrate in ammonia and nitric acid in water, with heat and the rotating motion of the granulating pan, form small granules of dry ammonium nitrate.

Our anhydrous ammonium nitrate in ammonia solution can be prepared in any convenient way. For example, it can be prepared as described in co-pending application U.S. Serial No. 842,571, filed September 28, 1959. We prefer to use concentrations of ammonium nitrate in ammonia from about 44 percent to about 75 percent.

The nitric acid solutions that we use can be prepared by any convenient means. We prefer to use concentrations of nitric acid from about 55 percent to about 95 percent. The nitric acid that we add to the granulating pan reacts with the ammonia added with the ammonium nitrate to form more ammonium nitrate. Since the reaction is exothermic, the water added in the anhydrous solution of ammonium nitrate in ammonia and whatever water was added with the aqueous nitric acid solution, is driven off in the form of steam. If the concentrations of reactants are at the lower limits of the ranges set forth above then we must add heat to the pan since the heat derived from the exothermic reaction is not enough to drive off all the water in the form of steam or we may preheat one or both of the reactant streams.

Referring now to the drawing, the granulating pan which we employ is a rotating circular pan 10, mounted at an angle from the horizontal. The pan 10 is mounted at its center 12 and rotated by any convenient means such as motor 14. The pan 10 has a rim 16 around the edge which serves to retain the particles in the pan. We prefer to use a pan of about 15 feet in diameter, set at an angle of about 45 degrees from the horizontal, rotating at about 14 r.p.m. The pan 10 we prefer has a foot high rim 16 running around the edge of it. The rotating motion of the pan 10 causes granules of ammonium nitrate to be formed. The size of the granules is controlled by the height of the rim 16 around the edge of the pan 10, larger granules being formed when a higher rim 16 is used. When the desired size is reached the granules spill over the rim 16 at the low point of the periphery.

We start our process by heating our rotating granulating pan 10 and we simultaneously add a solution of nitric acid in water and a solution of anhydrous ammonium nitrate in ammonia, adding crystals of ammonium nitrate if necessary. Once the process is operating it is not necessary for us to add any more crystals of ammonium nitrate. The heat of reaction from the ammonia and nitric acid vaporizes the water in the ammonium nitrate bed of the pan. At times the heat of reaction is not sufficient to drive off the water and heat from an external source (not shown), such as heating coils in the pan 10 or hot gases blown across the top of the pan 10, is provided, or additional heat may be added by preheating one or both of the reactant streams. The original seed crystals from the start of the process and the other crystals later formed grow and form into granules of ammonium nitrate. When they reach the desired size they are spilled continuously over the rim 16 of the granulating pan 10. By thorough mixing of the reactants deep in the ammonium nitrate bed of the rotating granulating pan 10, and because of the rapidity of the formation of the ammonium nitrate from the reactants, losses of free ammonia and of free acid from the system are negligible.

Anyone skilled in the art can manipulate the variables of our process to suit the specific type of product desired. For example, factors that can be varied are the speed of rotation of the pan, the rate of addition of the reactants, the temperature of the system, the height of the rim of the pan, etc.

It can be readily seen that other types of granulators, than the one we prefer, can be used for the process of our invention, although the pan-type granulator has an advantage in that automatic size selection is achieved. Other variations will naturally occur to those skilled in the art. For example, instead of, or in addition to heating the area in which the process is operating, the reactants themselves can be preheated before being added to the granulator. Small amounts of additives such as limestone, ammonium sulfate, urea, sodium nitrate, etc., can be added and thus incorporated in the ammonium nitrate granules produced by our process. Also, the granules of our process can be coated with substances such as limestone, rock phosphate, diatomaceous earth, dolomite, talc, fuller's earth, etc.

Example I

To a pan, 15 feet in diameter, set at an angle of 45 degrees from the horizontal, and rotating at 14 r.p.m. small crystals of ammonium nitrate were added until there was a bed of ammonium nitrate halfway up the foot high rim running around the edge of the pan at the low point of the periphery of the pan. The pan and bed were then heated to 140° F. and the pan maintained at that temperature. A solution consisting of 25 percent ammonia, 74.5 percent ammonium nitrate, and 0.5 percent water and a solution of 60 percent nitric acid in water were then added continuously to the pan at a rate such that the granules spilling over the rim of the pan were of a size such that 95 percent were retained on a 20 mesh screen. The granules thus made contained about 95 percent ammonium nitrate and less than 5 percent water.

Example II

To a pan 15 feet in diameter, set at an angle of 45 degrees from the horizontal, and rotating at 14 r.p.m. small crystals of ammonium nitrate were added until there was a bed of ammonium nitrate halfway up the foot high rim running around the edge of the pan at the low point of the periphery of the pan. The pan and bed were then heated to 250° F. and the pan maintained at that temperature. A solution consisting of 25 percent ammonia, 74.5 percent ammonium nitrate, and 0.5 percent water and a solution of 67.5 percent nitric acid in water were then continuously added to the pan at a rate such that 95 percent of the granules spilling over the rim of the pan were retained on a 20 mesh screen. The granules consisted of 99.5 percent ammonium nitrate and less than 0.5 percent water.

Example III

To a pan 15 feet in diameter, set at an angle of 45 degrees from the horizontal, and rotating at 14 r.p.m. small crystals of ammonium nitrate were added until there was a bed of ammonium nitrate halfway up the foot high rim running around the edge of the pan at the low point of the periphery of the pan. The pan and bed were then heated to 140° F. and the pan maintained at that temperature. A solution consisting of 50 percent ammonia, 49.5 percent ammonium nitrate, and 0.5 percent water and a solution of 60 percent nitric acid in water were then added continuously to the pan at a rate such that 95 percent of the granules spilling over the rim of the pan were retained in a 20 mesh screen. The granules thus made contained about 95 percent ammonium nitrate and less than 5 percent water.

Example IV

To a pan 15 feet in diameter, set at an angle of 45 degrees from the horizontal, and rotating at 14 r.p.m., small crystals of ammonium nitrate were added until there were a bed of ammonium nitrate halfway up the foot high rim running around the edge of the pan at the low point of the periphery of the pan. The pan and bed were then heated to 140° F. and the pan maintained at that temperature. A solution consisting of 25 percent ammonia, 69 percent ammonium nitrate, and 6.0 percent water and a solution of 61.7 percent nitric acid in water were then added continuously to the pan at a rate such that 95 percent of the granules spilling over the rim of the pan were retained in a 20 mesh screen. The granules thus made contained about 95 percent ammonium nitrate and less than 5 percent water.

Example V

To a pan 15 feet in diameter, set at an angle of 45 degrees from the horizontal, and rotating at 14 r.p.m., small crystals of ammonium nitrate were added until there was a bed of ammonium nitrate halfway up the foot high rim running around the edge of the pan at the low point of the periphery of the pan. The pan and bed were then heated to 140° F. and the pan maintained at that temperature. A solution consisting of 25 percent ammonia, 74.5 percent ammonium nitrate, and 0.5 percent water and a solution of 62.1 percent nitric acid in water were then added continuously to the pan at a rate such that 95 percent of the granules spilling over the rim of the pan were retained in a 20 mesh screen. The granules consisted of 99.5 percent ammonium nitrate and less than 0.5 percent water.

Example VI

To a pan 15 feet in diameter, set at an angle of 45 degrees from the horizontal and rotating at 14 r.p.m., small crystals of ammonium nitrate were added until there was a bed of ammonium nitrate halfway up the foot high rim running around the edge of the pan at the low point of the periphery of the pan. The pan and bed were then heated to 140° F. and the pan maintained at that temperature. A solution consisting of 50 percent ammonia, 44 percent ammonium nitrate and 6.0 percent water and a solution of 60.6 percent nitric acid in water were then added continuously to the pan at a rate such that 95 percent of the granules spilling over the rim of the pan were retained in a 20 mesh screen. The granules thus made contained about 95 percent ammonium nitrate and less than 5 percent water.

Now having described our invention, what we claim is:

1. A continuous process of producing small, dry, solid ammonium nitrate granules which comprises continuously reacting a solution of ammonium nitrate in ammonia containing less than about 6% by weight of water with an aqueous solution of nitric acid on a granulating pan to continuously produce additional ammonium nitrate on said pan while simultaneously rotating said pan, the heat of said reaction removing substantially all of the water in the reaction mixture as steam, continuously rotating said pan to subject said ammonium nitrate to a rotating motion whereby substantially dry granules of ammonium nitrate are continuously formed on said pan, the production, granulating and drying of said ammonium nitrate occurring essentially simultaneously on said pan, and continuously removing the substantially dry granular ammonium nitrate from said pan.

2. The process of claim 1 wherein external heat is provided to reduce the water content of the ammonium nitrate to less than 0.5 percent.

3. The process of claim 1 wherein less than 5 percent by weight of a material selected from the group consisting of limestone, ammonium sulfate, urea, and sodium nitrate is added.

4. The process of claim 1 wherein the rotating granulating pan is mounted at an angle from the horizontal and has a rim around its edge which serves to retain the particles in the pan, the height of the rim controlling the size of the granules.

5. A continuous process for producing small, dry, solid ammonium nitrate granules which comprises continually reacting a preheated solution of ammonium nitrate in ammonia in concentration of from about 44% to about 75% ammonium nitrate and containing less than about 6% by weight of water with a preheated aqueous solution of nitric acid in concentrations of from about 55% to 95% on a granulating pan to continuously produce additional ammonium nitrate on said pan while simultaneously rotating said pan, the heat of said reaction removing water from the reaction mixture as steam, continuously rotating said pan to subject said ammonium nitrate to a rotating motion whereby substantially dry granules of ammonium nitrate are continuously formed on said pan, the production, granulating and drying of said ammonium nitrate occurring essentially simultaneously on said pan, and continuously removing the substantially dry ammonium nitrate from said pan.

References Cited by the Examiner

UNITED STATES PATENTS

| | | | |
|---|---|---|---|
| 400,207 | 3/89 | Hake | 23—103 |
| 1,256,513 | 2/18 | Blom | 23—103 |
| 2,077,469 | 4/37 | Fazel | 23—103 |
| 2,770,539 | 11/56 | Martenet | 23—103 |
| 2,902,342 | 9/59 | Kerley | 23—103 |
| 3,030,657 | 4/62 | Von Reppert | 71—64 |

FOREIGN PATENTS

| | | |
|---|---|---|
| 152,109 | 6/53 | Australia. |
| 827,322 | 2/60 | Great Britain. |

OTHER REFERENCES

Chem. Engineering, for Oct. 1951, pp. 168–170, 23–313.

MAURICE A. BRINDISI, *Primary Examiner*.

GEORGE D. MITCHELL, *Examiner*.